United States Patent
Matsui et al.

(10) Patent No.: US 7,685,017 B2
(45) Date of Patent: Mar. 23, 2010

(54) COMMUNICATION INTERMEDIATING METHOD, INTERMEDIATING DEVICE, AND COMMUNICATION DEVICE

(75) Inventors: Kazuki Matsui, Kawasaki (JP); Soichi Nishiyama, Kawasaki (JP); Youji Kohda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1631 days.

(21) Appl. No.: 09/855,775

(22) Filed: May 16, 2001

(65) Prior Publication Data

US 2002/0083119 A1 Jun. 27, 2002

(30) Foreign Application Priority Data

Dec. 26, 2000 (JP) ............................. 2000-395734

(51) Int. Cl.
*A63H 30/00* (2006.01)
(52) U.S. Cl. ............................. 705/14.19; 705/4; 705/6; 705/66; 705/27
(58) Field of Classification Search ................ 705/14.4, 705/14.6, 14.19, 14.66, 27
See application file for complete search history.

(56) References Cited

U.S. PATENT DOCUMENTS

| | | | |
|---|---|---|---|
| 6,356,879 B2 | 3/2002 | Aggarwal et al. | |
| 6,525,747 B1 * | 2/2003 | Bezos | 715/751 |
| 6,572,662 B2 | 6/2003 | Manohar et al. | |
| 6,714,975 B1 * | 3/2004 | Aggarwal et al. | 709/224 |
| 2001/0014868 A1 * | 8/2001 | Herz et al. | 705/14 |
| 2001/0049623 A1 | 12/2001 | Aggarwal et al. | |
| 2002/0002571 A1 | 1/2002 | Manohar et al. | |

FOREIGN PATENT DOCUMENTS

| | | |
|---|---|---|
| EP | 0 957 437 A2 | 11/1999 |
| EP | 0 957 437 A3 | 8/2000 |
| JP | 10-334051 | 12/1998 |
| JP | 2000-029908 | 1/2000 |
| JP | 200020530 | 1/2000 |
| JP | 2000-148864 | 5/2000 |

OTHER PUBLICATIONS

Eichner, Matt, "Everyone's on the Same Page with iKena," PR Newswire, Jun. 6, 2000, p. 1.*
Clark, Don, "Crowdburst Sees Web Browsing as Group Activity," Wall Street Journal, Apr. 20, 2000, p. B.12.*
Webster's II New Riverside University Dictionary, 1988, Houghton Mifflin Company, p. 251.*

* cited by examiner

*Primary Examiner*—Jeffrey D Carlson

(57) ABSTRACT

Promoting efficient communication among users. Uses having a symbol of the same network resource are led to the same virtual space. Specifically, intermediary server 2 converting ID of merchandise icon and ID of virtual space for chat is provided. When user terminal 1 obtained a merchandise icon reports merchandise icon ID to the intermediary server 2, ID of a virtual space corresponding to the merchandise icon is returned to the user terminal 1. A user can share information on each merchandise by participating in this virtual space. Namely, users having a common purpose can chat with each other.

12 Claims, 15 Drawing Sheets

| Icon ID | Section | Preference Level | Virtual Space ID |
|---|---|---|---|
| Icon-v101-200v1 | Interesting | 1 | xxx1.vender101.co.jp |
| | | 2 | xxx2.vender101.co.jp |
| | | ⋮ | ⋮ |
| | | 10 | xxx10.vender101.co.jp |
| | Purchase | 1 | yyy1.vender101.co.jp |
| | | 2 | yyy2.vender101.co.jp |
| | | ⋮ | ⋮ |
| | | 10 | yyy10.vender101.co.jp |
| | Trash Box | 1 | zzz1.vender101.co.jp |
| | | 2 | zzz2.vender101.co.jp |
| | | ⋮ | ⋮ |
| | | 10 | zzz10.vender101.co.jp |
| Icon-v213-001-v1.1 | Interesting | 1 | ppp1.vender101.co.jp |
| | ⋮ | | ⋮ |

| Icon ID | Icon Data |
|---|---|
| Icon-v101-200v1 | C:¥user¥icon¥v101.gif |
| Icon-v213-001-v1.1 | C:¥user¥icon¥v213.gif |
| Icon-v310-053-v2 | C:¥user¥icon¥v310.xml |
| ⋮ | ⋮ |

*Fig. 2*

| Icon ID | Section | Coordinate Value | Layout Time | Save Time |
|---|---|---|---|---|
| Icon-v101-200v1 | Interesting | (x,y)=150.220 | 2000.7.1 12:25:39 | 2000.7.1 13:00:15 |
| ... | ... | ... | ... | ... |
| Icon-v213-001-v1.1 | Purchase | (x,y)=150.320 | 2000.6.1 19:30:01 | 2000.7.1 13:00:15 |
| ... | ... | ... | ... | ... |

*Fig. 4*

| Icon ID | Section | Preference Level | Virtual Space ID |
|---|---|---|---|
| Icon-v101-200v1 | Interesting | 1<br>2<br>...<br>10 | xxx1.vender101.co.jp<br>xxx2.vender101.co.jp<br>...<br>xxx10.vender101.co.jp |
| | Purchase | 1<br>2<br>...<br>10 | yyy1.vender101.co.jp<br>yyy2.vender101.co.jp<br>...<br>yyy10.vender101.co.jp |
| | Trash Box | 1<br>2<br>...<br>10 | zzz1.vender101.co.jp<br>zzz2.vender101.co.jp<br>...<br>zzz10.vender101.co.jp |
| Icon-v213-001-v1.1 | Interesting | 1 | ppp1.vender101.co.jp |
| | ... | | ... |

Fig. 5

| User ID | Personal Info. |
|---|---|
| 123456<br>123457<br>123458<br>⋮ | Fujitsu Taro<br>Nippon Ichiro<br>Akashi Hanako<br>⋮ |

*Fig. 6*

| GETURL (Request Command String) | User ID | Icon ID | Preference Data |

Fig. 8

| User ID | Connection Status |
|---|---|
| 123456 | ONLINE |
| 123457 | ONLINE |
| 123458 | OFFLINE |
| ⋮ | ⋮ |

*Fig. 11*

| Icon ID | Section | Preference Level | Virtual Space ID |
|---|---|---|---|
| Icon-v101-200vl | Interesting | 1 | xxx1.vender101.co.jp #ch-xxx1 vender101@xxx1.co.jp |
| | | 2 | xxx2.vender101.co.jp #ch-xxx2 vender101@xxx2.co.jp |
| | | ... | ... |
| | Purchase | 1 | yyy1.vender101.co.jp # ch-yyy1 vender101@yyy1.co.jp |
| | | 2 | yyy2.vender101.co.jp |
| | ... | ... | ... |

COMMUNICATION INTERMEDIATING METHOD, INTERMEDIATING DEVICE, AND COMMUNICATION DEVICE

BACKGROUND OF THE INVENTION

1. Technical Field

The present invention relates to network-based information services, e.g. online shopping services and information search services, provided on the Internet or other networks.

2. Description of Related Art

Since utilization of the Internet is rapidly diffused, general users without expertise in computers routinely use network services such as information search and online shopping. By diffusion of mobile phones, Internet access from the mobile phones is also rapidly diffused. Usually Internet access is done by using various web browser. However, users not accustomed to operating computers have difficulty operating the web browsers because the web browsers have many menus. Conversely, it is difficult to viewably display web pages on screens of the mobile phone with limited space.

Therefore various technologies for easily operating browsers e.g. IP3 are provided. IP3 allows embedding of merchandise information or search result in image data and extraction of the embedded information. Search services for searching image information such as Infoseek (Registered Trademark) are provided. Since search results are displayed by icons, users can select necessary information by intuition.

Taking the state into consideration, it is expected that icons and images representing merchandise information (hereinafter referred to as merchandise icons) are distributed on the Internet.

Meanwhile, various shared-information types among users are provided on the Internet. For example, mailing list and electronic bulletin board are shared-information types.

Software allowing text-based chat among users browsing the same Web Page e.g. "gooey" is also provided. Furthermore, systems allowing chat among users entering the same virtual electronic meeting room such as IRC and "Web chat" are provided.

In case of "gooey," by chatting with a user browsing the same Web Page, one can share information with the user having the same hobbies and purpose, and therefore can effectively collect information and make friends. However, in case of information share per Web Page, users cannot always do chat fitting for their purpose because purposes of users accessing a Web Page is broad. Similar problems occur in other shared-information types.

SUMMARY OF THE INVENTION

An object of the present invention is to promote effective communication among fellow users by leading, via network services, users having goals in common to the same information-sharing sites.

To solve the problems, the present invention allows easy share of information by users who downloaded the same merchandise icon via a network. The present invention also allows effective and purpose-fitting information collection by providing an information-sharing place per merchandise icon.

Specifically, a first aspect of the present invention provides a communication intermediating method for mediating communication of user terminals by sharing a virtual space on a network, comprising:

A: a step for giving the user terminals a symbol of a network resource;

B: a step for preparing a correspondence table where an identifier of the virtual space and identifiers of the symbol are correlated;

C: a step for providing an intermediating terminal that can communicate with the user terminals and can convert the identifier of the symbol and the identifier of the virtual space according to the correspondence table;

D: a step for sending the identifier of the symbol to the intermediating terminal from the user terminals;

E: a step for reporting the identifier of the virtual space corresponding to the symbol to the user terminals from the intermediating terminal; and F: a step wherein the user terminals participate in the virtual space according to the identifier of the virtual space reported and start to communicate with another user terminal having the symbol.

This system is constructed by connecting user terminals, a communication server and an intermediating terminal via a network. The communication server provides a virtual space on a network. An e-mail server on a mailing list, a www server on a Web chat, and an IRC server on an IRC (Internet Relay Server) are examples of the communication server.

A symbol on a network is, for example, an icon representing merchandise sold on a network or an icon showing search result on a network. Hereafter an item icon is explained as an example of the symbol. A user terminal can own a merchandise icon by downloading it from a shopping site on a network or a homepage of a merchandise seller.

A user having a merchandise item pushes a prepared button if he would like to communication with another user having the same merchandise icon. For example, if a user would like to do Web chat, he pushes a Web chat button. Then an identifier of the merchandise icon is sent to an intermediating terminal and Web chat URL corresponding to the identifier is returned to the user terminal. This URL is of Web chat Web Page provided by a communication server. The user terminal accesses the received URL to start to chat with other users having the same merchandise icon. Chat start processing is done by a WWW browser installed in the user terminal.

Incidentally, serial number with which a shopping site provider provides a merchandise item and URL representing a site where an icon provider stores a merchandise icon are examples of an identifier of a merchandise icon.

A communication intermediating method for mediating communication between user terminals on a network, comprising:

a step for correlatively storing an identifier of a virtual space where the user terminals participate and communicate with each other and an identifier of a network resource;

a step for receiving the symbol identifiers from the user terminals; and a step for sending the virtual-space identifiers corresponding to the symbol received according to the recorded data.

The intermediating terminal of the first aspect of the present invention uses this method.

A computer-readable recording medium having a communication intermediary program for executing steps of:

a step for selectably displaying a symbol of a network resource on a user terminal;

a step for receiving the identifier of the network resource selected according to operation of the user terminal;

a step for obtaining an identifier of a virtual space correlated to the received symbol identifiers according to a correspondence table where the identifier of the network resource and the virtual-space identifiers are previously correlatively stored; and a step for sending the obtained identifier of the virtual space to the user terminal.

Herein a computer-readable recording medium is preferably a floppy disk, hard disk, semiconductor memory, CD-ROM, DVD, MO, etc.

A fourth aspect of the present invention provides an intermediating device for mediating communication between user terminals on a network, comprising:

a correspondence table correlatively storing an identifier of a virtual space where the user terminals participate and communicate with each other and an identifier of a symbol of a network resource;

a first reception means receiving the identifier of the symbol from the user terminals; and a first transmission means sending the identifier of the virtual space corresponding to the received symbol according to the correspondence table.

This device corresponds to the intermediating terminal of the first aspect of the present invention.

A fifth aspect of the present invention provides the intermediary of the second aspect of the present invention, wherein the correspondence table correlatively stores the identifier of the virtual space, the identifier of the symbol, and level of interest in the symbol.

In this device, the first reception means receives the identifier of the symbol and the level of interest and the first transmission means sends to the user terminals the identifier of the virtual space corresponding to combination of the received identifier of the symbol and the level of interest according to the correspondence table.

Interest level is, for example, "having some interest, but not intending to buy," "would like to buy," "have no interest," etc.

The intermediating device of the fourth aspect, wherein the correspondence table correlatively stores the virtual-space identifiers, the symbol identifiers, and similarity level of user preference to the symbol; the first reception means receives from the user terminals the symbol identifiers and predetermined preference data representing the similarity level of user preference; the first transmission means calculates similarity level of user preference according to the preference data and sends to the user terminal an identifier of the virtual space corresponding to combination of the received symbol identifiers and the similarity level of user preference according to the correspondence table.

Similarity level of user preference is calculated by a usual statistical method from set out of merchandise icons on a display, time merchandise icon is lately moved, time of saving merchandise icons.

The intermediating method of the sixth aspect, wherein the predetermined preference data includes positional information of the symbol displayed on user terminals.

Positional information is a coordinate representing position of merchandise icon in a screen. For example, if a merchandise icon is displayed on a near side of a user in a user terminal, the intermediating device determines that similarity level is high.

A communication method used by a user terminal on a network, comprising:

a step for obtaining a symbol of a network resource;

a step for sending a symbol identifiers to a predetermined information terminal that can convert an identifier of a virtual space where the user terminal communicates with another user terminal and the symbol identifiers;

a step for receiving an identifier of a virtual space corresponding to the symbol from the information terminal;

a step for participating in the virtual space according to the virtual-space identifiers and starting to communicate with other user terminals having a common symbol.

The user terminals of the first aspect of the present invention use the communication method.

A ninth aspect of the present invention provides a computer-readable recording medium having a communication program used by user terminals on a network for executing steps of:

a step for obtaining a symbol of a network resource via a network and selectably displaying them;

a step for sending a symbol of a network resource selected by a user to an intermediating device;

a step for receiving an identifier of a virtual space corresponding to an identifier of a network resource sent according to a correspondence table of the intermediating device where a symbol of a network resource and a virtual space are previously correlatively stored; and a step for connecting to the virtual space according to the received identifier of the virtual space and starting chat.

A communication device for communicating on a network, comprising:

an obtaining means obtaining a symbol of a network resource;

a communication means participating in a virtual space on the network to communicate another communication terminal;

a second sending means sending a symbol identifiers to a predetermined information terminal that can convert an identifier of the virtual space and the symbol identifiers;

a second receiving means receiving an identifier of a virtual space corresponding to the symbol from the information terminal; and a connection means starting communication with other user terminals having a common symbol according to the virtual-space identifiers.

This communication method is used by the user terminals of the first aspect of the present invention.

The communication device of the tenth aspect further having a preference table where a symbol obtained by the communication device and level of interest in the symbol are correlatively stored, wherein the second sending means sends a symbol identifiers and the level of interest to the predetermined information terminal.

The level of interest is similar to the level of interest of the fifth aspect of the present invention.

The communication device of the tenth aspect further having a preference table where a symbol obtained by the communication device and predetermined preference data representing similarity level of user preference to the symbol are correlatively stored, wherein the second sending means sends a symbol identifiers and the preference data to the predetermined information terminal.

The similarity level of user preference is similar to the similarity level of the similarity level of user preference of the sixth aspect of the present invention.

The communication device of the tenth aspect, wherein the predetermined preference data includes positional information of the symbol displayed on the user terminal.

A merchandise presentation method working with a chat system allowing exchange of messages among multiple user terminals by sharing a virtual space on a network, comprising:

selectably presenting to a user terminal a symbol prepared for each merchandise to identifiably display the merchandise via a network;

obtaining and sending to a user terminal an identifier of a virtual chat space which is made to correlate to an identifier of a symbol and then stored when receiving an identifier of a symbol reported according to user select; and connecting the user terminal to the virtual chat space to start to exchange messages with other user terminals.

A fifteenth aspect of the present invention provides a merchandise information exchange support method, comprising:

a step for preparing a correspondence table where merchandise and virtual chat space for exchanging information on the merchandise are previously correlated;

a step for presenting to a user terminal a symbol prepared for each merchandise to identifiably display the merchandise via a network;

a step for identifying a symbol of a merchandise selected by a user terminal;

a step for obtaining and reporting to the user terminal information for identifying a virtual chat space correlated to relevant merchandise according to the correspondence table; and a step for starting exchange of information on the relevant merchandise among user terminals.

A communication support method, comprising:

a step for preparing for each merchandise a chat space virtually installed on a network which invites users interested in relevant merchandise and a correspondence table where merchandise and a chat space corresponding the merchandise are correlatively stored;

a step for selectably presenting to a user terminal a symbol prepared for each merchandise to identifiably display the merchandise via a network;

a step for identifying a symbol of merchandise selected by a user terminal; and a step for obtaining information for identifying a virtual chat space correlated to relevant merchandise according to the correspondence table to issue command for inviting relevant user terminal to relevant virtual chat space and starting communication between users having interest in common merchandise.

BRIEF DESCRIPTION OF THE DRAWINGS

FIG. 2 is an conceptual explanatory diagram of data in icon DB;

FIG. 4 is a conceptual explanatory diagram of data in preference DB;

FIG. 5 is a conceptual explanatory diagram of data in correspondence DB;

FIG. 6 is a conceptual explanatory diagram of data in user DB;

FIG. 8 is an explanatory diagram showing an example of data sent to an intermediary server;

FIG. 11 is a conceptual explanatory diagram of data in connection situation DB;

FIG. 15 a conceptual explanatory diagram of data in correspondence DB.

DETAILED DESCRIPTION OF THE PREFERRED EMBODIMENTS

Outline of the Present Invention

As described above, users browsing a common Web Page can share information because connection among users can be established by using URL (Uniform Resource Locator) of a Web Page as an identifier representing a site for information share, in other words, a virtual space for communication. Therefore the inventors come to conceive leading users having a symbol of the same network resource to the same virtual space to allow chat between users having a same purpose. In the following example, information of online sales merchandise is explained as a network resource.

However, it is difficult to previously attach an identifier such as URL to a merchandise icon which is downloaded and saved in a user terminal. Even if it can be attached, there is a problem. Namely, a service provider selling merchandise on a shopping website often would like to change URL of a merchandise icon the service provider provides. The service provider can change URL of a merchandise icon on a shopping website, but cannot change URL attached to a merchandise icon that has already been downloaded in a user terminal.

Therefore the present invention provides an intermediary server. The intermediary server converts an identifier for identifying a merchandise icon and an identifier of a virtual space for chat. When a user terminal that obtained a merchandise icon reports an identifier of the merchandise icon to the intermediary server, an identifier of a virtual space corresponding to the merchandise icon is returned to the user terminal. Users can share information per merchandise by participating in the virtual space. Furthermore, even if correspondence between a merchandise icon and a virtual space varies, users having a merchandise icon can be led to an appropriate virtual space according to newest correspondence.

Conversation is difficult to be established among users with a different interest level of a merchandise icon even if they downloaded the same merchandise icon. Therefore the present invention provides user interface (UI) at the user terminal for reporting level of interest in the merchandise to the intermediary server according to set out of the merchandise icon. Sending the level of interest extracted by UI and an identifier of the merchandise icon to the intermediary server allows information share among users having a similar purpose. In the following embodiments, level of interest is any of the three steps "interesting (having some interest)," "purchase (would like to purchase)," and "trash box (lost interest)."

Furthermore, the present invention allows users chatting on an appropriate virtual space to disclose and copy merchandise icons. With this, distribution of merchandise icons are promoted. In addition, the merchandise icons are broadly diffused among internet users and merchandise icon providers can do effective advertisement and marketing.

First Embodiment

Configuration (1) Overall Configuration

Figure 1:
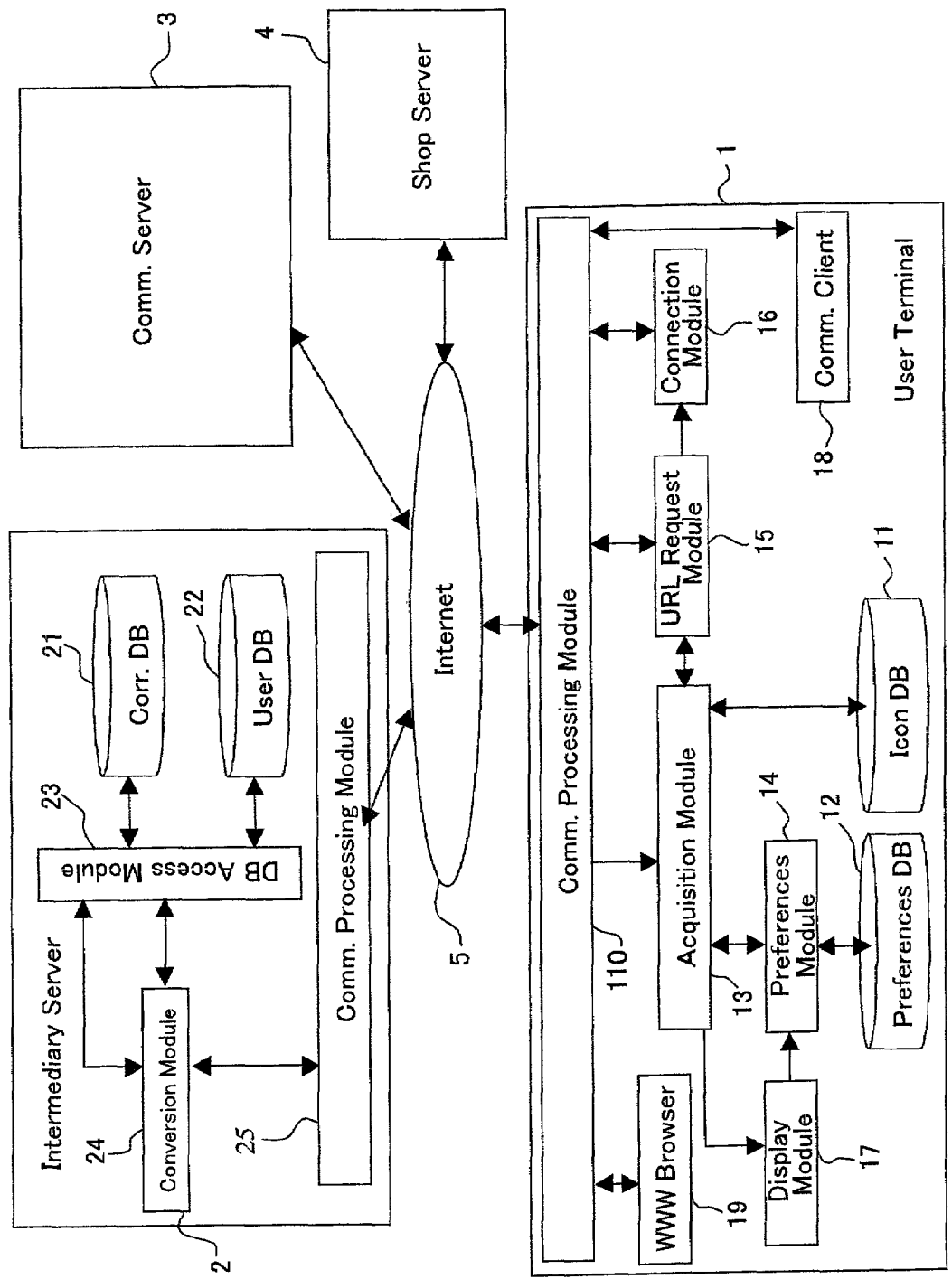
FIG. 1 is an overall configuration diagram according to a first aspect of the present invention.

FIG. 1 is an overall configuration diagram of a communication intermediary system according to the first aspect of the present invention. This system is configured by connecting user terminal 1, intermediary server 2, communication server 3 and shop server 4 via the Internet.

The user terminal 1 shares a virtual space with other user terminals via the communication server 3 and can chat with each other. The user terminal 1 can also download merchandise icons (symbol of network resource) provided by the shop server 4.

The intermediary server 2 converts an identifier of a merchandise icon into an identifier of a virtual space for chat and reports the result to the user terminal 1.

The communication server 3 provides a virtual space for the user terminal 1 to chat. A mailing list server, WWW server, and IRC server are examples of the communication server 3.

The shop server 4 provides merchandise icons in a shopping site on the Internet 5. Information on merchandise sold on the Internet and an identifier of a virtual space are attached to the merchandise icons. Incidentally, the merchandise icons are provided by service providers providing a shopping site on the shop server 4 or merchandise providers selling merchandise on the shop server 4.

The following exemplifies a Web Page on Web chat as a virtual space for chat. In this case, URL is used as an identifier of the virtual space.

(2) User Terminal

The user terminal 1 has icon DB 11, preference DB 12, acquisition module 13, preference module 14, URL request module 15, connection module 16, display module 17, communication client 18, WWW browser 19, and communication processing module 110.

Of the above-mentioned functions, the communication client 18 is for participating in a virtual space on a network to communicate with other user terminals. The communication client 18 is, for example, a WWW browser, IRC client for IRC, or e-mail device for mailing list.

The WWW browser 19 has a function accessing a shopping site provided by the shop server 4 and obtaining it.

The acquisition module 13 is a function for downloading merchandise icons from the shop server 4 and the display module 17 is a function displaying downloaded icons as contents of a shopping cart of a user. Normally, these functions are realized by executing Flash, JAVA Applet or other plug-in program in a user terminal when a shopping site is accessed by the WWW browser 19.

The following explains functions of respective parts. First explains information stored in icon DB 11 and preference DB 12. FIG. 2 is a conceptual explanatory diagram of information stored in the icon DB 11. Icon IDs (identifiers of symbols) and addresses of icon data are stored in the icon DB 11. "Icon ID" is an identifier for uniquely identifying a merchandise icon. This identifier is usually attached to each merchandise icon by a provider of the shop server 4. "Icon data" describes an address indicating where merchandise icon data are stored. The merchandise icon data includes image data of the merchandise icon, merchandise information and the like.

Figure 3:
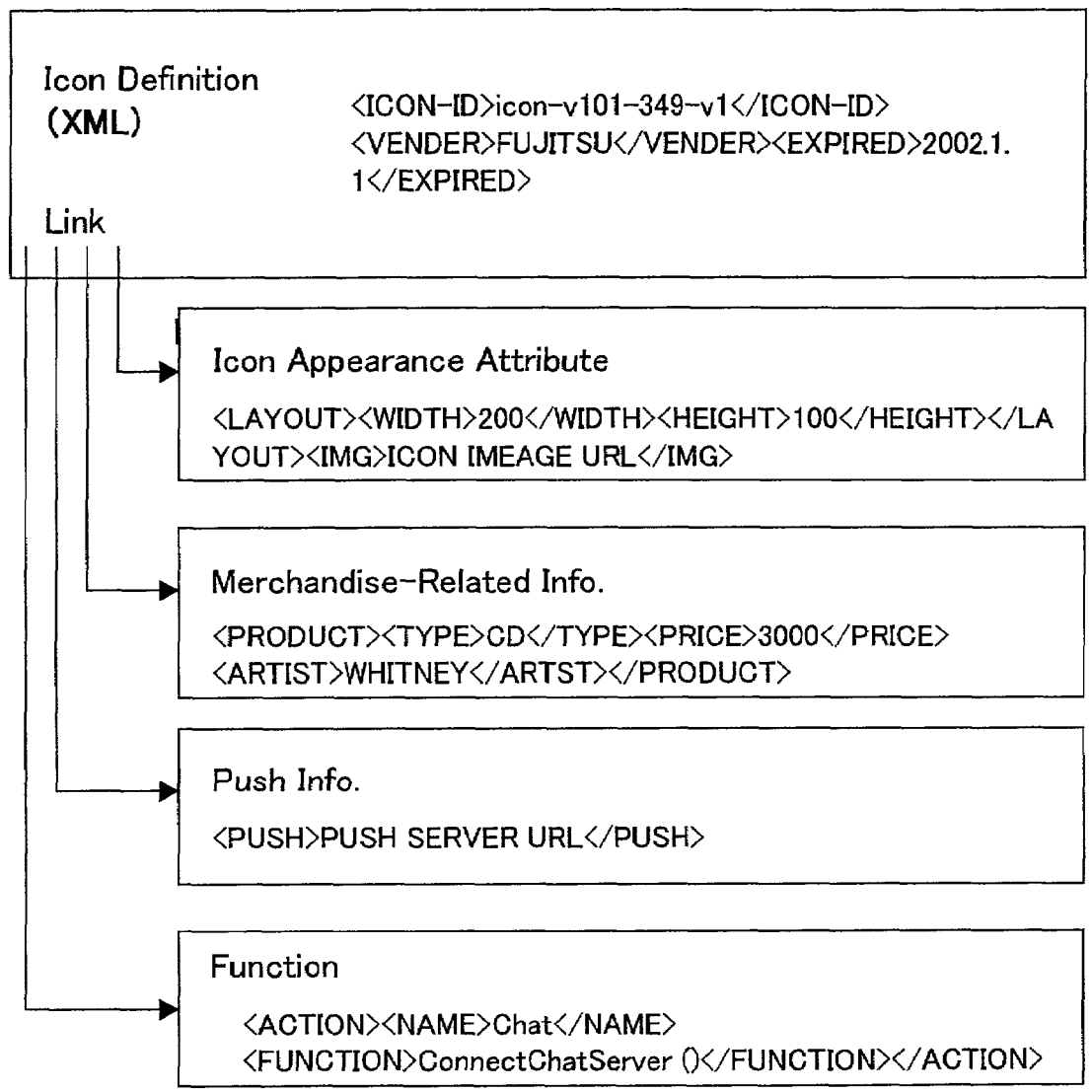
FIG. 3 is an explanatory diagram showing an example of merchandise icon data format.

FIG. 3 is an example of a format of merchandise icon data. The merchandise icon data includes icon definition, icon appearance attribute, merchandise-related information, push information, and function. "Icon definition" describes a provider of a merchandise icon, expiration date, etc. "Icon appearance attribute" describes icon size and an address of an image file. "Merchandise-related information" describes merchandise name, price, etc. "Push information" describes an address of a server providing newest information in relation to the icon. This system describes a function of a button displayed with a merchandise icon. This system describes display of a button for starting chat (hereinafter referred to as chat button) and a command issued when a user presses the button (refer to the below-mentioned FIG. 9).

FIG. 4 is a conceptual explanatory diagram of information stored in the preference DB 12. As described below, information stored in the preference DB 12 is used for calculating level of user preference to merchandise icons. In the preference DB 12, icon ID, section (level of interest), coordinate value, set out time, save time are stored. "Icon ID" is similar to the case of the above-mentioned icon DB 11. "Section" describes predetermined value representing level of user interest in merchandise. In this example, "interesting," "purchase," or "trash box" is described as a predetermined value. "Coordinate value" describes position of a merchandise icon in a shopping cart displayed with display module 17. "Set out time" describes date when a merchandise icon is lastly operated. "Save time" describes newest save time of a shopping cart. Hereafter coordinate value, set out time, and save time are referred to as preference data.

As described above, the acquisition module 13 downloads merchandise icon from the shop server 4 and stores it in the icon DB 11.

The preference module 14 obtains preference data for an obtained merchandise icon from the display module 17 and stores it in the preference DB 12.

The URL request module 15 sends icon ID, section, and preference data to the intermediary server 2 according to instruction of a user and obtains an identifier of a virtual space corresponding to the merchandise icon.

The connection module 16 activates communication client 18 and starts communication on a virtual space obtained from the intermediary server 2.

As described above, the display module 17 displays an obtained merchandise icon and a shopping cart on a display. Furthermore, the display module 17 obtains the above-mentioned preference data from an output part such as a display (not shown in the figure) according to user operation.

The communication processing module 110 sends and receives data via the Internet 5.

(3) Intermediary Server

The intermediary server 2 has correspondence DB 21, user DB 22, DB access module 23, conversion module 24, and communication processing module 25.

FIG. 5 is a conceptual explanatory diagram of information stored in the correspondence DB 21. In the correspondence DB 21, icon ID, section, preference level (similarity level of preference), and virtual space ID are correlated. Namely, combination of icon ID, section, and preference level determines which virtual space a user is led to. Incidentally, at least icon ID and virtual space ID are stored in the correspondence DB 21. Section and preference level may be stored in the correspondence DB 21 according to needs.

"Icon ID" and "section" are as mentioned above. "Preference level" represents how a user prefers a merchandise icon. In this example, ten levels are set. Preference level is calculated according to preference data sent from the user terminal 1 with icon ID. "Virtual space ID" describes an identifier for identifying a virtual space for chat, which is URL in this example. URL of a Web Page in Web chat, a channel name in IRC, and an e-mail address in mailing list are examples of virtual space ID.

FIG. 6 is a conceptual explanatory diagram stored in the user DB 22. User ID and personal information are stored in the DB 22. "User ID" is an identifier for identifying a user in this system. Communication ID for identifying a user on a communication system independent of this system may be used as user ID. For example, an e-mail address on a mailing list or a nickname on IRC is substituted for user ID. "Individual information" is predetermined information on a user and is communication ID in this example. Besides this, user name, address, sex, age, hobby, etc. can be stored according to needs.

The DB access module 23 updates the correspondence DB 21 and the user DB 22.

The conversion module 24 converts icon ID into virtual ID according to the correspondence DB 21. The conversion module 24 also calculates preference level according to preference data.

The communication processing module 25 sends and receives data via the Internet 5.

Processing

Figure 7:
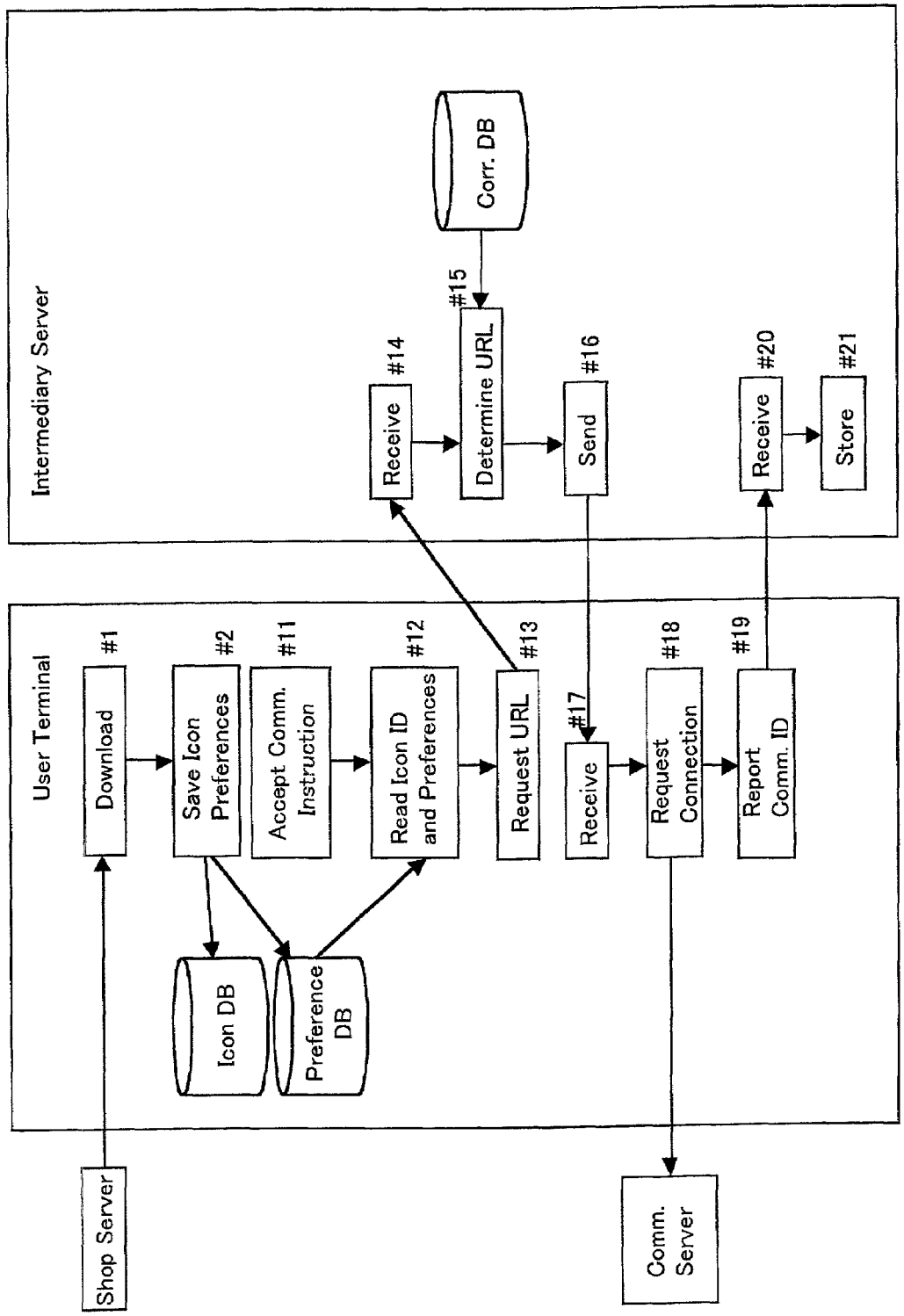
FIG. 7 is an explanatory diagram showing flow of communication intermediary processing according to the first aspect of the present invention.

FIG. 7 explains flow of communication intermediary processing in this system. To simplify the explanation, the following takes a case that conversation among user terminals is performed by Web chat.

The user terminal 1 downloads a merchandise icon from the shop server 4 by the acquisition module 13 and obtains icon ID and icon data (#1). In this system, a "Chat" button for starting chat is included in icon data (refer to below-described FIG. 9). The downloaded merchandise icon are stored in the icon DB 11 (#2). The preference module 14 stores section, coordination, and set out time in the preference DB 12 (#2) according to the user operation on the display.

A user presses the "Chat" button if he would like to chat with another user about merchandise after obtaining a merchandise icon. The URL request module 15 receives instruction of starting chat by pressing the button (#11). The URL request module 15 reads icon ID, section, and preference data from the preference DB 12 (#12). Furthermore, the URL request module 15 requests URL of a Web Page from the intermediary server 2 via the communication processing module 110 (#13). FIG. 8 shows a configuration of data sent to the intermediary server 2. The request includes icon ID, section, and preference data in addition to a request command "GETURL."

The intermediary server 2 determines URL with reference to the correspondence DB 21 (#15) when receiving the above-mentioned request (#14). The conversion module 24 determines a level from among the above-mentioned ten levels according to preference data by a statistical method. The conversion module 24 determines URL by a combination of icon ID, section, and preference level. The conversion module 24 sends the determined URL to the user terminal 1 (#16).

The user terminal 1 receives URL from the intermediary server 2 with the URL request module 15 (#17). Furthermore, the connection module 16 activates the communication client 18 to pass the above-mentioned URL to the communication client 18 (#18). With this, communication among users having the same merchandise icon is started.

In this example, the connection module 16 obtains communication ID of a user from the communication client 18 and reports it to the intermediary server 2 (#19). The intermediary server 2 stores communication ID of each user in the user DB 22. By reporting communication ID to the intermediary server 2 from the user terminal 1, communication ID is automatically stored in the user DB 22.

Screen Example

Figure 9:
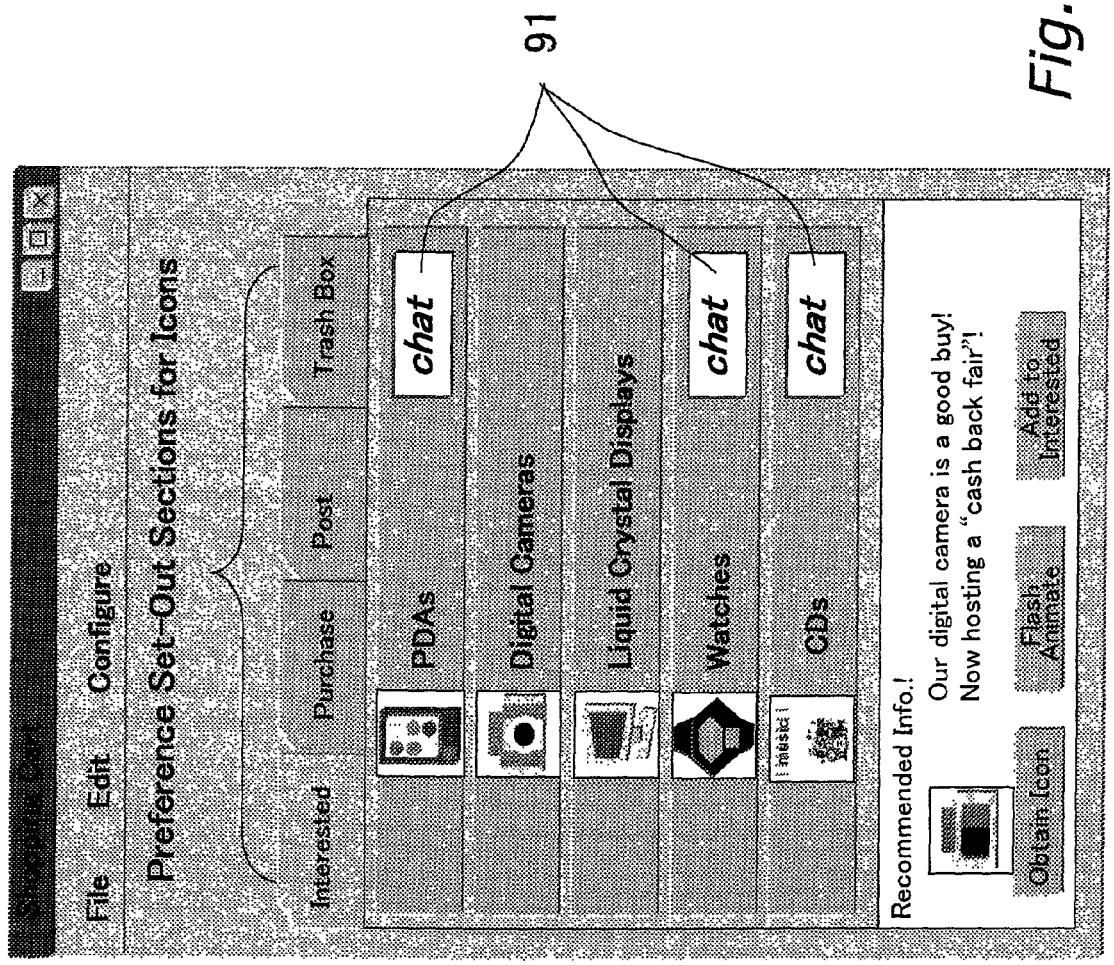
FIG. 9 is a display example of a merchandise icon and a button for chat.

FIG. 9 is a display example of a shopping cart and a merchandise icon. In this example, sections "interesting," "purchase," and "trash box" are displayed on the shopping cart. A user arranges a merchandise icon in an appropriate section according to level of interest in the merchandise. In this example, a "public zone" is provided for a user to disclose merchandise icons to his chat partner. Disclosure of merchandise icons will be described in a below-mentioned second embodiment of the present invention.

The "Chat" button 91 is displayed for each merchandise icon. Pressing the button allows a user to chat with another user having the same merchandise icon.

Second Embodiment

A second embodiment of the present invention shows an example of providing "public zone" for a shopping cart as shown in FIG. 9 and distributing merchandise icons among users.

Configuration

Figure 10:
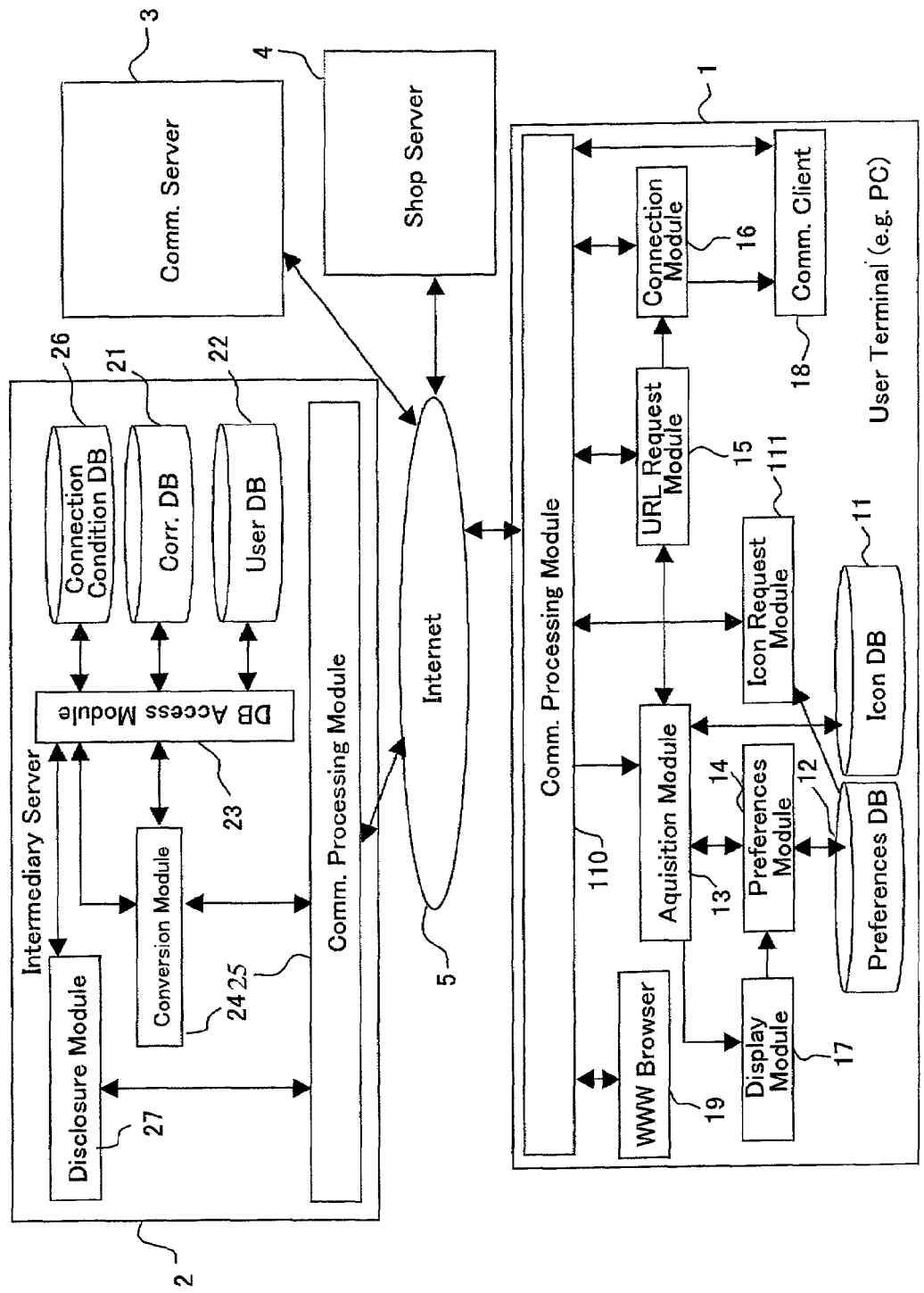
FIG. 10 is an overall configuration diagram of a communication intermediary system according to a second aspect of the present invention.

FIG. 10 is an overall configuration diagram of a communication intermediary system according to the second embodiment of the present invention. In this system, icon request module 111 is attached to the user terminal 1 and connection condition DB 26 is attached to the intermediary server 2. Other components and functions are similar to the first embodiment.

The icon request module 111 accepts "icon request" requesting a merchandise icon disclosed by a chat-partner user and sends/receives the merchandise icon via the intermediary server 2. To accept the request the icon request module 111 previously displays a function button. The icon request module 111 sends a disclosed merchandise icon according to icon request of another user terminal. Furthermore, the icon request module 111 displays a merchandise icon disclosed by another user independently of chat contents.

FIG. 11 is a conceptual explanatory diagram of information stored in the connection condition DB 26 of the intermediary server 2. User ID and connection condition are stored in the DB 26. "Connection condition" describes a value representing whether a user terminal connects to the intermediary server 2. Herein the value is "ONLINE" or "OFFLINE."

In addition to the above-mentioned function, the conversion module 24 mediates transmission of the above-mentioned object request and merchandise icons according to connection condition of a user terminal.

Processing

Figure 12:
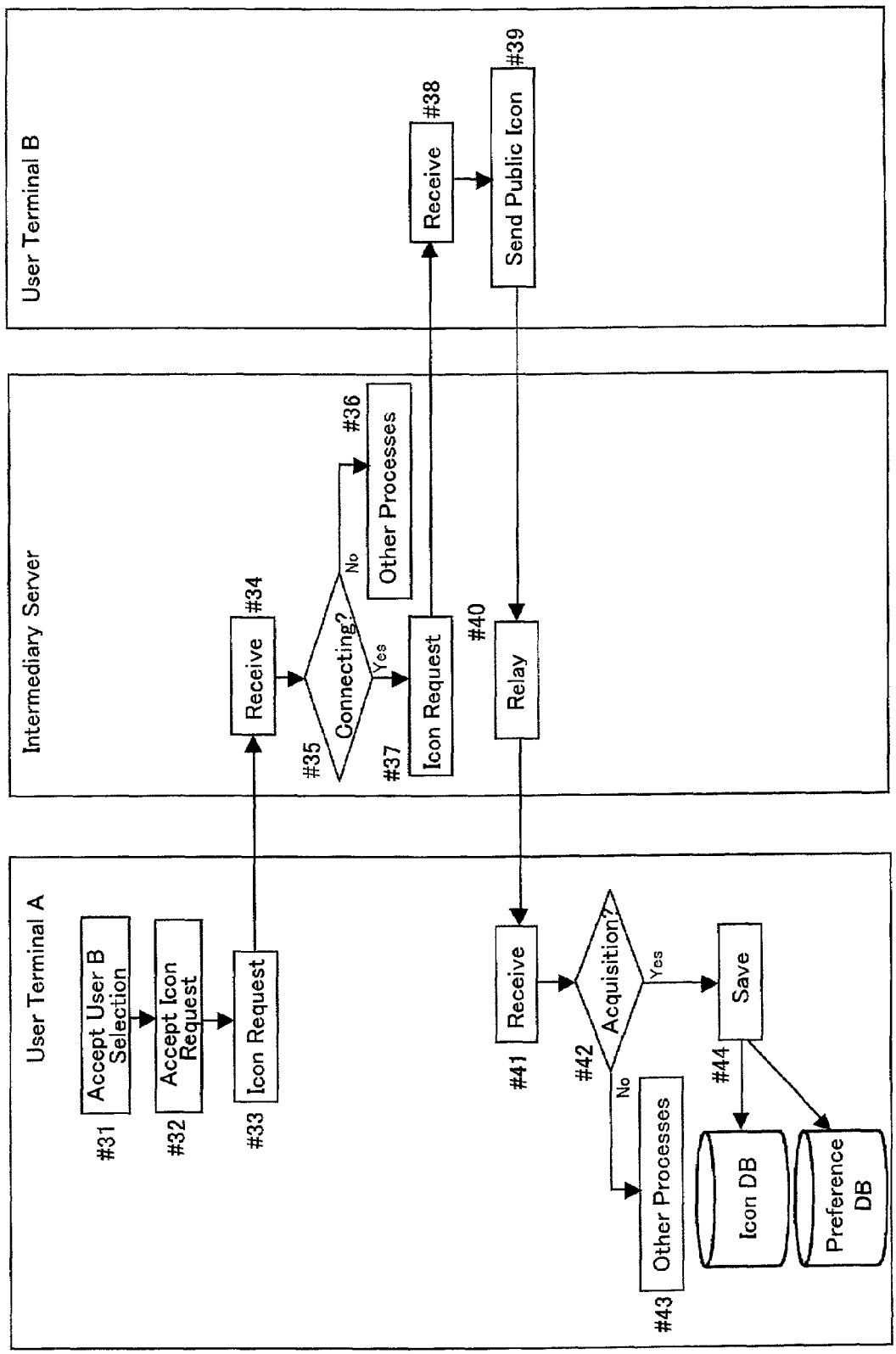
FIG. 12 is an explanatory diagram showing flow of icon distribution promoting processing according to the second aspect of the present invention.

FIG. 12 shows flow of distribution promotion processing of merchandise icons in this system. User A (user terminal A) and user B (user terminal B) are participating in the same URL and chatting with each other. Chat contents and participant user list are displayed on each user terminal with the communication client 18.

User A selects user B from the participant user list and presses an "obtain icon" button (#31). This button is displayed by the icon request module 11. The icon request module 111 accepts icon request by press of the button (#32) and sends the request to the intermediary server 2 (#33). The icon request includes communication ID of user B.

The intermediary server 2 determines whether user terminal B is being connected to the intermediary server 2 with reference to the connection condition DB 26 when it receives the above-mentioned request (#34). If it is determined that user terminal B is not being connected to the intermediary server 2, an error message such as "user B is currently offline" is returned to user terminal A. Otherwise a disclosed merchandise icon is requested from user terminal B (#37).

Upon receiving the above mentioned request (#38), user terminal B sends merchandise icon ID disposed in a public zone and its icon data to the intermediary server 2 (#39).

User terminal A receives the above-mentioned data via the intermediary server 2 and displays the merchandise icon independently of chat contents (#40 and #41). User terminal A accepts instruction of whether to obtain the merchandise icon by a user (#42). The instruction is "not obtain," user terminal A performs processing such as deleting display of a merchandise icon (#43). If the instruction is "obtain," user A passes icon ID and icon data to the acquisition module 13 and instructs saving of the merchandise icon (#44).

Screen Example

Figure 13:
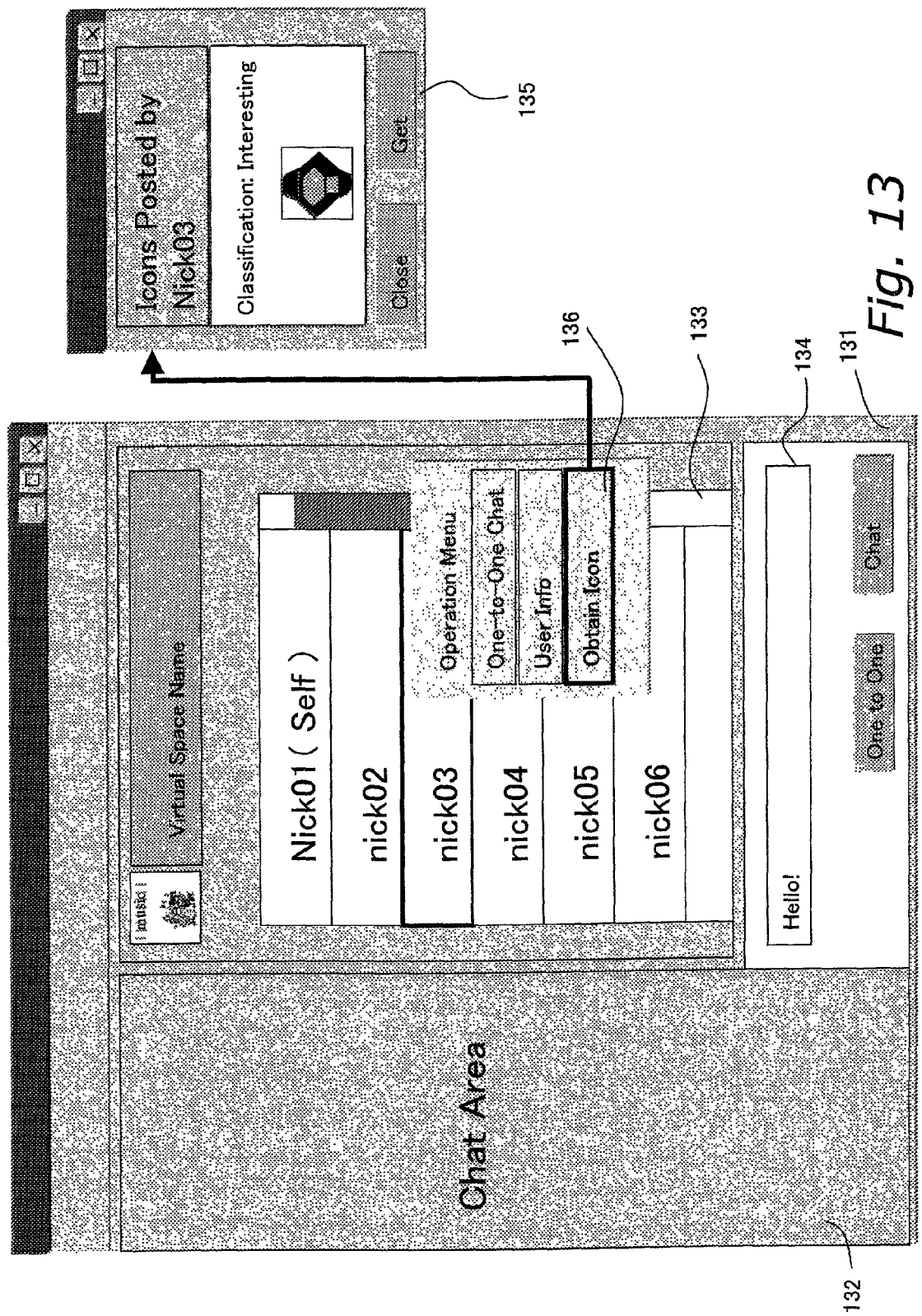
FIG. 13 is a display example of a disclosed icon.

FIG. 13 is a display example by the icon request module 111. In this figure, window 131 is displayed by the communication client 18. Chat contents is displayed on window 132. Participant user list 133 and input field 134 are also displayed on the chat window 131.

When a user "nick03" is selected from the participant user list 133 and an obtain icon button 136 is pressed, object window 135 is displayed. The window 135 displays merchandise icons received from a terminal of user "nick03." If "get" is selected in the window, icon ID and icon data of a merchandise icon are stored in icon DB 11.

Use of the present invention allows easy and efficient communication by users because users having a common interest is led to a communication space on a network.

From the following detailed description in conjunction with the accompanying drawings, the foregoing and other objects, features, aspects and advantages of the present invention will become readily apparent to those skilled in the art.

Figure 14:
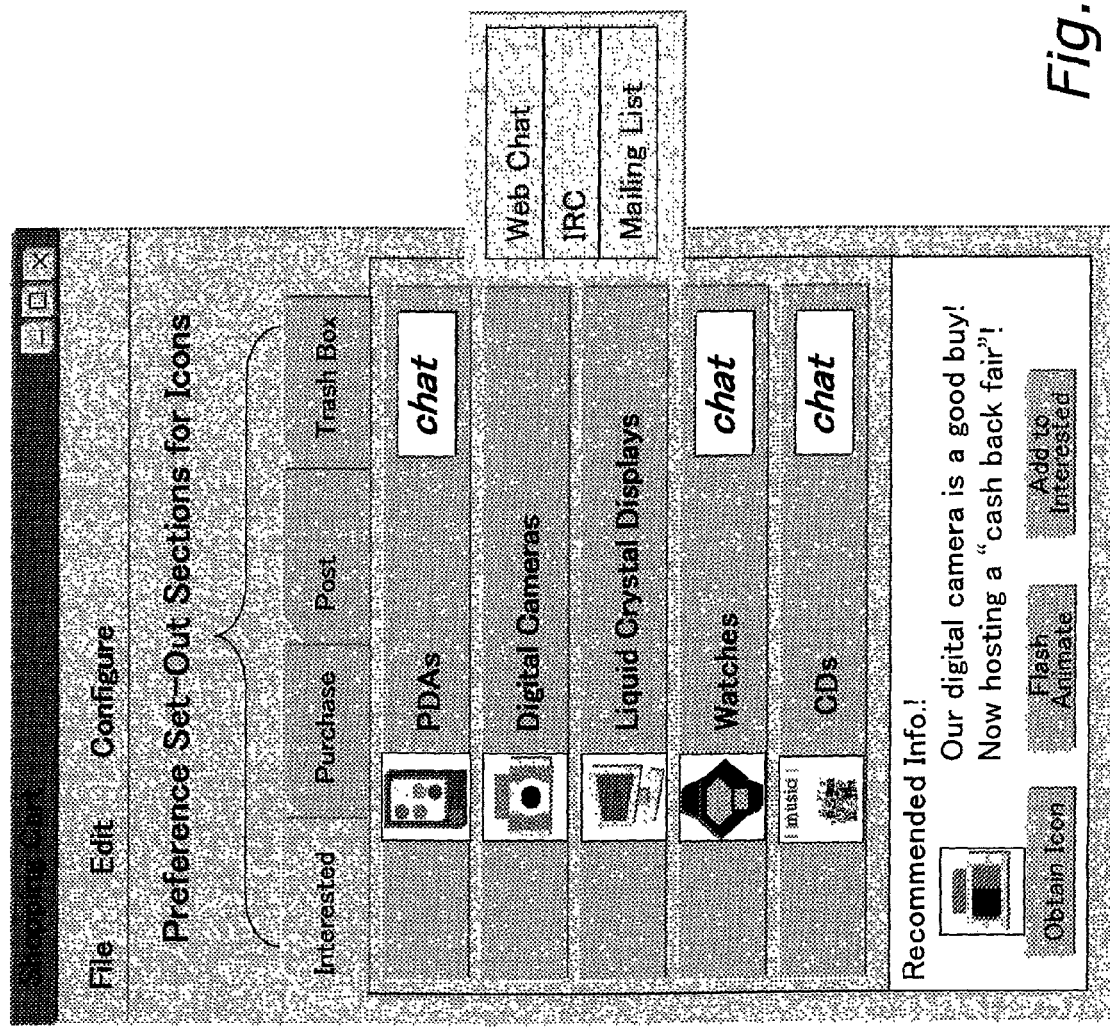
FIG. 14 is another display example of a merchandise icon and a button for chat.

Another Embodiment (A) In the above-mentioned embodiments, only "Chat" is correlated to each merchandise icon as a communication system. However, multiple communication system may be selectable for a merchandise icon. For example, multiple communication button is displayed in a pulldown menu format for a merchandise icon "PDA" in FIG. 14. If a button is selected from the menu, the communication client 18 corresponding to the selected communication system is activated and communication starts.

FIG. 15 shows a conceptual explanatory diagram of information stored in correspondence DB 21 in this case. In the correspondence DB 21, multiple virtual spaces according to types of communication systems are correlated to icon ID. In this figure, three virtual spaces e.g. URL for Web chat, channel name for IRC, and e-mail address for mailing list are correlated to icon ID "Icon-v101-200vl."

A type of a virtual space to be correlated to each merchandise item can be changed in the correspondence DB 21. For example, only URL for Web chat is correlated to a merchandise icon and URL and channel name are correlated to another merchandise icon. This correlation may be set according to needs of merchandise providers i.e. providers of network resources and providers of shopping sites.

(B) The present invention comprises a computer-readable recording medium having a program for executing the above-mentioned methods of the present invention. Herein a computer-readable medium is preferably a floppy disk, hard disk, semiconductor memory, CD-ROM, DVD, MO, etc.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A communications intermediating method for mediating communications among user terminals on a network, the communications intermediating method, comprising:
storing, in an intermediating terminal, a correspondence table in which identifiers for virtual spaces, identifiers for symbols and levels of similarity in preference of users towards the symbols are correlated; and
computing, in the intermediating terminal, a level of similarity in preference based on the preference data received from the user terminal, and notifying to the user terminal a virtual space identifier corresponding to the received symbol identifier and the computed level of similarity in preference based on the correspondence table.

2. A communications intermediating method for mediating communications user terminals carry out sharing at least one virtual space on a network, via an intermediating terminal, the communications intermediating method, comprising:
storing, in a user terminal, a preference table in which at least one network resource symbol and predetermined preference data are correlated, the preference data including positional information of the symbol to be displayed on the user terminal and indicating a level of similarity in preference of a user towards the symbol;
storing, in the intermediating terminal, a correspondence table in which identifiers for virtual spaces, identifiers for symbols and levels of similarity in preference of users towards the symbols are correlated;
sending an identifier for the symbol and the preference data indicating the level of similarity in preference from the user terminal to the intermediating terminal;
computing, in the intermediating terminal, a level of similarity in user preference based on the preference data received from the user terminal, and notifying to the user terminal a virtual space identifier corresponding to the received symbol identifier and the computed level of similarity in user preference based on the correspondence table;
wherein based on a reported virtual-space identifier the user terminal participates in the virtual space and initiates communication with at least one other user terminal having the same symbol.

3. An intermediating device for mediating communications among user terminals on a network, the intermediating device including:
a computer readable recording medium storing a correspondence table in which identifiers for virtual spaces, identifiers for symbols, and levels of similarity in preference of users towards the symbols are correlated; and
a computer processor executing a first reception unit capable of receiving the symbol identifiers and the preference data indicating the level of similarity of preferences from the user terminals;

a calculating unit capable of calculating a level of similarity in user preference based on the preference data received from the user terminal; and a first transmission unit capable of transmitting to the user terminals a virtual space identifier corresponding to the received symbol identifier and the computed level of similarity in user preference based on the correspondence table.

4. The intermediating device set forth in claim 3, wherein:

said correspondence table correlatively stores the virtual-space identifiers, the symbol identifiers, and interest levels in the symbols;

said first reception unit capable of receiving from the user terminals the symbol identifiers and the interest levels; and said first transmission unit capable of transmitting to the user terminals the virtual-space identifiers that based on said correspondence table correspond to the received symbol identifiers and to the received interest levels in combination.

5. A computer-readable recording medium on which is recorded a communications program for use by user terminals on a network, the computer-readable recording medium characterized by including a program configured for:

storing, in a user terminal, a preference table in which at least one network resource symbol and predetermined preference data are correlated, the preference data including positional information of the symbol to be displayed on the user terminal and indicating a level of similarity in preference of a user towards the symbol;

a step of acquiring via a network, and selectably displaying, network resource symbols;

a step of transmitting to an intermediating device identifiers for user-selected network resource symbols;

a step of receiving identifiers for virtual spaces that correspond to symbol identifiers transmitted based on a correspondence table in the intermediating device correlatively storing in advance network resource symbols with virtual spaces;

sending an identifier for the symbol and the preference data indicating the level of similarity in preference from the user terminal to the intermediating terminal;

a step of connecting to a given virtual space based on identifiers in received virtual spaces, and initiating chat.

6. A merchandise information exchange support method characterized by:

preparing a correspondence table in which merchandise and virtual chat spaces for exchanging information on the merchandise are correlated in advance;

storing, in an intermediating terminal, said correspondence table in which identifiers for virtual spaces, identifiers for symbols and levels of similarity in preference of users towards the symbols are correlated;

storing, in a user terminal, a preference table in which at least one network resource symbol and predetermined preference data are correlated, the preference data including positional information of the symbol to be displayed on the user terminal and indicating a level of similarity in preference of a user towards the symbol;

sending an identifier for the symbol and the preference data indicating the level of similarity in preference from the user terminal to the intermediating terminal;

computing, in the intermediating terminal, a level of similarity in preference based on the preference data received from the user terminal, and notifying to the user terminal a virtual space identifier corresponding to the received symbol identifier and the computed level of similarity in preference based on the correspondence table presenting to user terminals, via a network, symbols prepared per merchandise item in order to display the merchandise identifiably;

identifying merchandise symbols selected in user terminals;

acquiring and reporting to the user terminals information for identifying virtual chat spaces correlated based on the correspondence table to given merchandise; and enabling in a one user terminal exchange of information on the given merchandise with other user terminals to begin.

7. A computer-readable recording medium on which is recorded a communications intermediating program for mediating communications among user terminals on a network, the computer-readable recording medium on which is recorded a communications intermediating program for executing:

a step of selectably displaying on user terminals network resource symbols;

storing, in an intermediating terminal, a correspondence table in which identifiers for virtual spaces, identifiers for symbols and levels of similarity in preference of users towards the symbols are correlated;

a step of receiving identifiers for network resources selected in response to operations on the user terminals a step of acquiring virtual-space identifiers correlated to received network resource symbol identifiers based on a correspondence table made by correlatively storing in advance symbol identifiers with identifiers for virtual spaces;

a step of transmitting the acquired virtual-space identifiers to the user terminals; and computing, in the intermediating terminal, a level of similarity in preference based on the preference data received from the user terminal, and notifying the user terminal of a virtual space identifier corresponding to the received symbols identifier and the computed level of similarity in preferences based on the correspondence table.

8. A communications method for use by a user terminal on a network, the communications method comprising:

acquiring network resource symbols;

storing, in a user terminal, a preference table in which at least one network resource symbol and predetermined preference data are correlated, the preference data including positional information of the symbol to be displayed on the user terminal and indicating a level of similarity in preference of a user towards the symbol;

sending an identifier for the symbol and the preference data including the level of similarity in preferences from the user terminal to the intermediating terminal;

receiving from the information terminal virtual-space identifiers corresponding to the symbols;

participating, based on the virtual-space identifiers, in the virtual spaces and initiating communication with other user terminals having same symbols.

9. A communications device for communicating on a network, the communications device comprising:

a computer readable recording medium storing a preference table in which at least one network resource symbol and predetermined preference data are correlated, the preference data including positional information of the symbol to be displayed on the user terminal and indicating a level of similarity in preference of a user towards the symbol; and a computer processor executing
- an acquisition unit capable of acquiring network resource symbols;
- a communication unit capable of participating in virtual spaces on the network to carry out communications with other communications devices;
- a second transmission unit capable of transmitting symbol identifiers to a intermediating terminal enabling conversion between virtual-space identifiers and the symbol identifiers;
- a second reception unit capable of receiving from the intermediating terminal the virtual-space identifiers that correspond to the symbols;
- a sending unit capable of sending an identifier for the symbol and the preference data indicating the level of similarity in preference to the intermediating terminal; and
- a connection unit capable of initiating, based on the virtual-space identifiers, communication with other communications devices having the same symbols.

10. The communications device of claim 9, further comprising a preference table in which symbols acquired by the communications device of claim 9 and level of interest in the symbols are correlatively stored;
wherein said second transmission unit capable of transmitting to the intermediating terminal the symbol identifiers and the level of interest.

11. A merchandise presentation method cooperating with a chat system to enable exchange of messages mutually among multiple user terminals sharing virtual spaces structured on a network, the merchandise presentation method comprising:
- selectably presenting to a user terminal a symbol prepared for each merchandise to identifiably display the merchandise via a network;
- storing, in a user terminal, a preference table in which at least one network resource symbol and predetermined preference data are correlated, the preference data including positional information of the symbol to be displayed on the user terminal and indicating a level of similarity in preference of a user towards the symbol;
- storing, in the intermediating terminal, a correspondence table in which identifiers for virtual spaces, identifiers for symbols and levels of similarity in preference of users towards the symbols are correlated;
- sending an identifier for the symbol and the preference data indicating the level of similarity in preference from the user terminal to the intermediating terminal;
- computing, in the intermediating terminal, a level of similarity in preference based on the preference data received from the user terminal, and notifying to the user terminal a virtual space identifier corresponding to the received symbol identifier and the computed level of similarity in preference based on the correspondence table;
- obtaining and sending to a user terminal an identifier of a virtual chat space, which correlates to an identifier of a symbol and then stored when receiving an identifier of a symbol reported according to user selection; and
- connecting the user terminal to the virtual chat space to start to exchange messages with other user terminals.

12. A communications support method, characterized by:
- storing, in a user terminal, a preference table in which at least one network resource symbol and predetermined preference data are correlated, the preference data including positional information of the symbol to be displayed on the user terminal and indicating a level of similarity in preference of a user towards the symbol;
- storing, in the intermediating terminal, a correspondence table in which identifiers for virtual spaces, identifiers for symbols and levels of similarity in preference of users towards the symbols are correlated;
- sending an identifier for the symbol and the preference data indicating the level of similarity in preference from the user terminal to the intermediating terminal;
- computing, in the intermediating terminal, a level of similarity in preference based on the preference data received from the user terminal, and notifying to the user terminal a virtual space identifier corresponding to the received symbol identifier and the computed level of similarity in preference based on the correspondence table;
- preparing for each merchandise a chat space on a network which invites users interested in relevant merchandise and a correspondence table where merchandise and a chat space corresponding said merchandise are correlatively stored;
- selectably presenting to a user terminal a symbol prepared for each merchandise to identifiably display said merchandise via a network;
- identifying a symbol of merchandise selected by a user terminal; and
- obtaining information for identifying a virtual chat space correlated to relevant merchandise according to said correspondence table to issue a command for inviting relevant user terminal to relevant virtual chat space and starting communication between users having common interest in merchandise.

\* \* \* \* \*